(12) United States Patent
Yu et al.

(10) Patent No.: US 8,703,315 B2
(45) Date of Patent: Apr. 22, 2014

(54) MOBILE TERMINAL WITH USER IDENTIFICATION CARD INCLUDING PERSONAL FINANCE-RELATED INFORMATION AND METHOD OF USING A VALUE-ADDED MOBILE SERVICE THROUGH SAID MOBILE TERMINAL

(75) Inventors: Sang Woo Yu, Seoul (KR); Ki Hyong Lee, Seoul (KR); Hye Soon Kim, Seoul (KR); Jung Won Lee, Seoul (KR); Hae Seong Jang, Sungnam-shi (KR); Jae Jin Kim, Kimpo-shi (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 13/369,935

(22) Filed: Feb. 9, 2012

(65) Prior Publication Data
US 2012/0171538 A1 Jul. 5, 2012

Related U.S. Application Data

(62) Division of application No. 12/076,885, filed on Mar. 25, 2008, which is a division of application No. 10/512,548, filed as application No. PCT/KR02/01368 on Jul. 22, 2002.

(30) Foreign Application Priority Data

| Apr. 24, 2002 | (KR) | ............................... 2002-0022469 |
| May 6, 2002 | (KR) | ............................... 2002-0024735 |
| Jun. 5, 2002 | (KR) | ............................... 2002-0031751 |

(51) Int. Cl.
*H01M 2/10* (2006.01)
*H04M 1/00* (2006.01)

(52) U.S. Cl.
USPC .................. 429/96; 429/97; 429/98; 455/572

(58) Field of Classification Search
None
See application file for complete search history.

(56) References Cited

U.S. PATENT DOCUMENTS

| 4,593,409 A | 6/1986 | Miller |
| 5,333,176 A | 7/1994 | Burke et al. |
| 5,386,214 A * | 1/1995 | Sugawara .............. 343/700 MS |

(Continued)

FOREIGN PATENT DOCUMENTS

| EP | 0949595 | 10/1999 |
| EP | 1193986 | 4/2002 |

(Continued)

OTHER PUBLICATIONS

European Search Report for 10193637.5-2221, citing the above reference(s), Mar. 10, 2010.

(Continued)

*Primary Examiner* — Yoshitoshi Takeuchi
(74) *Attorney, Agent, or Firm* — Lowe Hauptman & Ham, LLP

(57) ABSTRACT

The present invention enables a user to receive a financial service anywhere through a mobile terminal equipped with a UIM (User Identification Module) electronic card. In the present invention, a user enters his or her password to a mobile terminal with a UIM card including subscriber telephone number, finance, authorization, and personal information, then, if the entered password is correct, authorization is processed with a remote authorizing server based on the authorization information. After authorization, user's requesting service, e.g., payment service, transaction particulars inquiry service, prepaid card recharging service is conducted through a mobile network.

6 Claims, 19 Drawing Sheets

(56) References Cited

U.S. PATENT DOCUMENTS

| | | | |
|---|---|---|---|
| 6,005,942 | A | 12/1999 | Chan et al. |
| 6,233,683 | B1 | 5/2001 | Chan et al. |
| 2002/0040936 | A1 | 4/2002 | Wentker et al. |

FOREIGN PATENT DOCUMENTS

| | | |
|---|---|---|
| JP | 2000049692 A | 2/2000 |
| JP | 2002185605 A | 6/2002 |
| KR | 20010018417 | 3/2001 |
| KR | 20010025503 | 4/2001 |
| KR | 20010063383 | 7/2001 |
| KR | 20010096375 | 11/2001 |
| WO | 97/45814 | 12/1997 |
| WO | 0197583 A2 | 12/2001 |
| WO | 02/11477 | 2/2002 |

OTHER PUBLICATIONS

Office Action for European Patent Application No. 02753251.4, citing the above reference(s), Apr. 8, 2011.

International Search Report for PCT/KR02/01368, citing the above reference(s), Jan. 8, 2003.

European Search Report for application No. 13175112.5, dated Sep. 3, 2013.

* cited by examiner

FIG. 12

Credit card payment particulars

Card Type : ○ ○ Card
Card No.   ○○-○○○○-○○○

| Date/Time | Amount | Member |
|-----------|--------|--------|
| ○○.○○.○○ | ○○○○○○ | X X X |
| ○○.○○.○○ | ○○○○○○ | X X X |

Total : ○○○○○○○

(a)

Prepaid card payment particulars

| Date/Time | Amount | Type |
|-----------|--------|------|
| ○○.○○.○○ | ○○○○○○ | Payment |
| ○○.○○.○○ | ○○○○○○ | Recharging |

Balance : ○○○○○○○

| Ticket Information | |  |  |
|---|---|---|---|
| Reserv. | Date | Seat No. | Amount |
| ○○Thea. | ○○.○○ | ○○ | ○○○○ |
| | | Total : | ○○○○ |

(a)

| Traffic Card Information | | |
|---|---|---|
| | Payment | Balance |
| Expressway | ○○○○ | ○○○○ |
| Subway | ○○○○ | ○○○○ |

(b)

MOBILE TERMINAL WITH USER IDENTIFICATION CARD INCLUDING PERSONAL FINANCE-RELATED INFORMATION AND METHOD OF USING A VALUE-ADDED MOBILE SERVICE THROUGH SAID MOBILE TERMINAL

CROSS REFERENCE TO RELATED APPLICATION

This application is a division of U.S. application Ser. No. 12/076,885, filed Mar. 25, 2008, which a division of U.S. application Ser. No. 10/512,548, filed Oct. 25, 2004, which is the national phase application of International Application No. PCT/KR02/01368, filed Jul. 22, 2002, which claims the priority of Korean Patent Application Nos. 2002-0022469, filed Apr. 24, 2002; 2002-0024735, filed May 6, 2002; 2002-0031751, filed Jun. 5, 2002, the disclosures of the above applications are incorporated herein by reference in their entirety.

1. TECHNICAL FIELD

The present invention relates to a method for payment and recharging using a mobile terminal equipped with a UIM (user identification module) card. Particularly, the present invention is directed to a mobile terminal equipped with a UIM card containing finance information and a method using the same so that the UIM card containing a number of finance and authorization information can be attached to a mobile terminal and both online and offline payment and recharging service can be provided by making use of a local wireless communication module.

2. BACKGROUND ART

In general, payment by an IC card (credit card, debit card, prepaid card, or traffic card) or recharging thereof can be processed only through a dedicated terminal. In case of online payment through the Internet, too, approval of payment can only be obtained by entering a card number and expiration date after purchasing goods at the corresponding shopping mall. A method utilizing a card, however, suffers from a problem that the card number can be exposed to others by, e.g., hacking because both card number and expiration date are entered at the time of payment for purchasing amount.

A system to resolve the aforementioned problem is disclosed in Korean Laid-Open Patent Application No. 2000-37185. The disclosed system enables prepaid transactions by embedding an RF chip for a non-contact type prepaid card with an identification number into a mobile communications terminal, with which occasional inquiry into the balance of the prepaid card and recharging thereof are carried out through the Internet. The disclosed system has several advantages such that since a non-contact type RF chip and antenna coil are embedded into a mobile communications terminal, there is no need to carry a card; inquiry into the balance information stored in the RF memory chip can be carried out through a Web server as well as a service terminal; and even recharging can also be fulfilled through a Web server instead of visiting a recharging station for a prepaid card at each and every occasion. However, since said RF chip dose not record monetary information except for the card identification number and actual monetary information according to the card identification number is stored in a Web server, a terminal at a membership store should make a reference to the Web server for the balance information, after which subsequent transactions are conducted; accordingly, the disclosed system is not well suited for the application to a traffic card of a bus or a subway where prompt transactions are demanded. Moreover, the disclosed system is no more than a mobile phone equipped with a pre-existing RF card so that interactions with a mobile phone are not implemented; therefore, a user can only carry out simple functions of making a reference to the Web server for the inquiry into the balance information and recharging by using the card identification number given at the time of subscription or purchase of the mobile phone.

In Korean Laid-Open Patent Application No. 1998-46928, an electronic purse card operating system is disclosed wherein, by embedding a combi-chip comprising a contact type and non-contact type smart card into a mobile device, functions of balance check, subtraction payment, and addition recharging are conducted by the contact type smart card, while balance check and subtraction payment are conducted by the non-contact type smart card. A recording area for electronic purse information of said two smart cards is synchronized so that identical electronic purse information is utilized, whereby convenience and promptness in usage and stability and security in data processing can be improved. However, the disclosed system also reveals a problem that since available money for payment is confined to the balance stored in the recording area of the combi-chip for electronic purse information, it can only be applied to a prepaid card; therefore, application areas are limited.

3. DISCLOSURE OF INVENTION

The object of the present invention to resolve said problem is to provide a mobile terminal equipped with a user identification module card containing finance information and a method using the same so that payment of finance information and recharging through wireless communication are enabled by storing various finance information into a detachable user identification module card.

A further object of the present invention is to provide a battery pack with an IC card containing subscriber information, thereby providing a mobile communications service according to the present invention without change in the design or structure of the mobile terminal.

In a method for utilizing a mobile terminal capable of insertion, decryption, and recording of the user identification module card containing a mobile identification number, finance, authorization, and personal information; and Internet access through wireless communication and local area wireless communication using a local area communication module, a method for utilizing a mobile terminal equipped with a user identification module card containing finance information to achieve said objective is characterized in that it comprises the steps of: reading mobile identification number, finance, authorization, and personal information stored in the user identification module card inserted into the user identification module card slot of the mobile terminal and deciding whether or not the entered user password is identical; when the decision is made to be identical, displaying menus of payment service, transaction particulars inquiry service, prepaid card recharging service, ticket issuing and utilization service or traffic card issuing and utilization service, thereby allowing the user to select his or her desired service; and according to said service selected by the user, providing the corresponding service by making an access to a service providing system through the Internet.

A mobile terminal equipped with a user identification module card containing finance information is also characterized in that a mobile terminal capable of wireless data communication through Internet access as well as voice communication comprises a user identification module card containing a mobile identification number, finance, authorization, and personal information; and a user identification module card slot where said user identification module card is inserted and recording and decryption of information stored in the memory of the inserted user identification module card are performed.

In addition, a battery pack of a mobile terminal according to the present invention is characterized in that it comprises a bottom casing which has its bottom outer face engaged with a battery housing compartment of the mobile terminal and a battery cell container having an opening in the top face; a printed circuit board installed on the top face of said cell in said container separated by an insulator; a top casing covering the top face of said container engaged with the upper part of said bottom casing while securing fixed dimensions of space over the top face of said printed circuit board and forming an opening at one face of said space; a palette having an IC chip holder on the top face thereof and capable of entering and exiting said space through said opening; and a connector connecting said IC chip and said printed circuit board when said palette equipped with said IC chip is inserted into said space.

According to the present invention characterized in said manner, because various card information is stored in a single user identification module card inserted into a mobile terminal, there is no need to carry a number of cards for payment and by making use of the communication function of the mobile terminal, payment can be processed even at a place where a card reader is not readily available. Moreover, when payment is processed by using a local area communication module of the mobile terminal, an effort of inserting a card into a payment terminal can be relieved. In addition, revelation of the card number or password during payment process can be avoided, while at the same time, a roaming service for finance information can be made possible as well as communication roaming service.

In addition, by enabling issuing and cancellation of various cards and IDs to be processed inside a mobile terminal through a wireless communications network, time and Manual labor dedicated to card issuing affairs can be saved and cards management work can be simplified.

Finally, since a battery pack according to the present invention enables attachment and detachment of an IC chip without modifying the mechanical or electrical structure of a CDMA mobile terminal which is in wide spread, potential for mass production of a mobile terminal is extremely increased.

4. BRIEF DESCRIPTION OF DRAWINGS

In the drawings:

FIGS. 12 and 13 are diagrams illustrating examples displaying transaction particulars inquiries according to the present invention;

Figure 18:
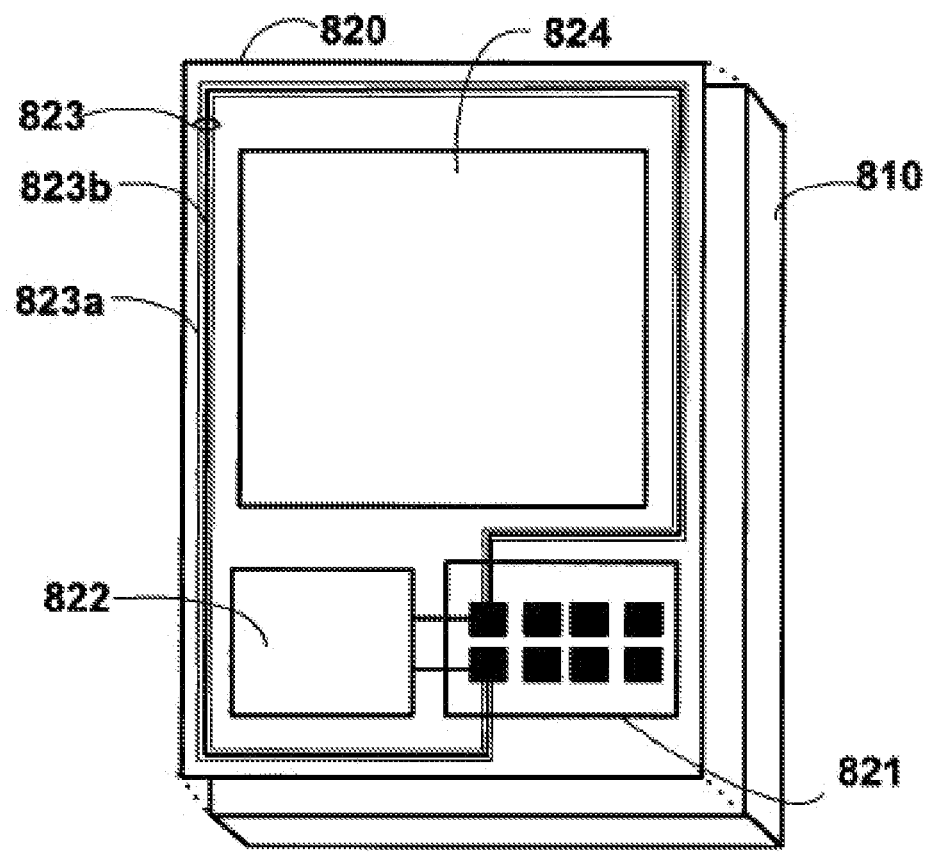
Figure 19:
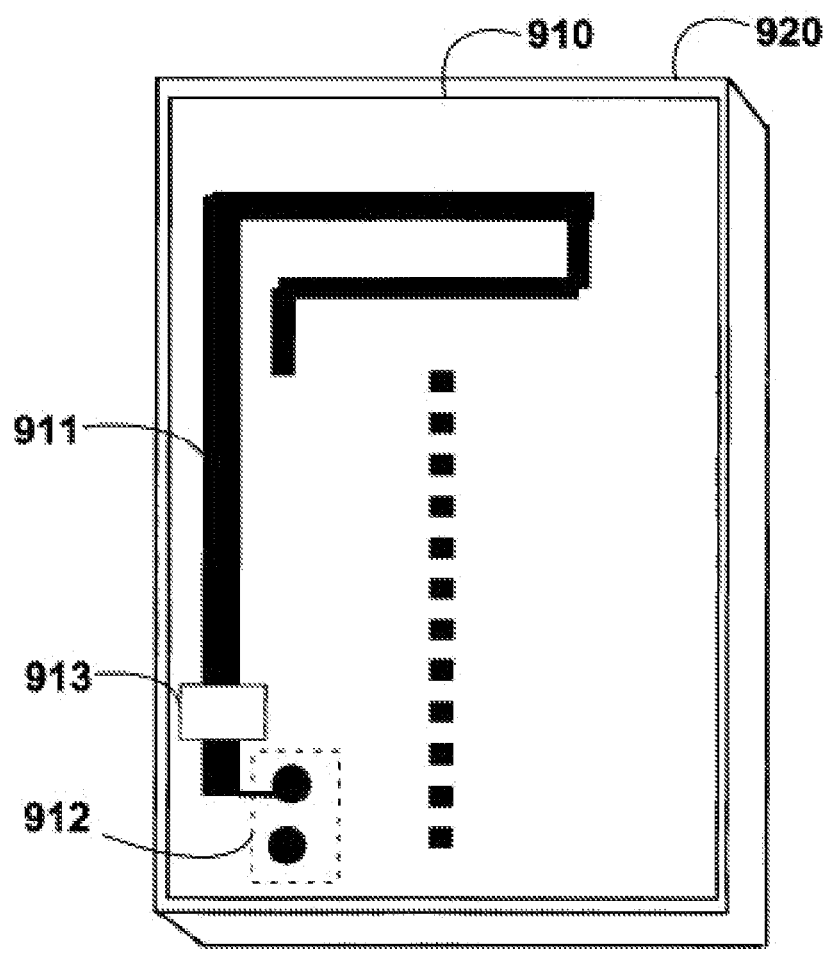

FIG. 18 is a diagram illustrating a battery pack of a mobile terminal wherein an RF receiving antenna is embedded according to an embodiment of the present invention, more specifically, the structure of a battery pack wherein an IC chip having a traffic card function is installed; and FIG. 19 is a diagram illustrating a battery pack of a mobile terminal wherein an RF receiving antenna is embedded according to another embodiment of the present invention and illustrates a structure when an IC chip having a traffic card function is installed inside the main body of a mobile terminal.

5. MODES FOR CARRYING OUT THE INVENTION

Hereinafter, preferred embodiments of the present invention will be described in detail with reference to appended drawings.

Figure 1:
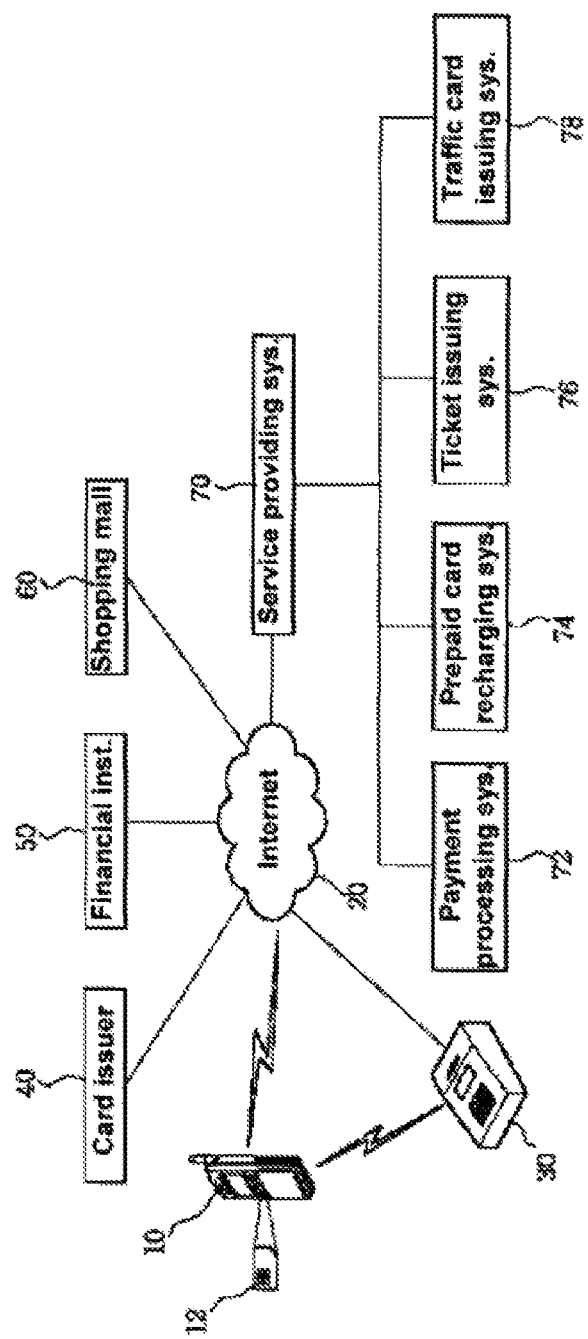
FIG. 1 is a diagram illustrating a simplified structure of the entire system according to the present invention.

FIG. 1 is a block diagram illustrating a simplified structure of the entire system according to the present invention comprising a mobile terminal 10, a payment terminal 30, a card issuing company 40, a financial institution 50, a shopping mall 60, and a service providing system 70.

The said mobile terminal 10, equipped with an apparatus (slot) capable of installing and decrypting a user identification module (hereinafter, referred to as UIM) card 12 and a local area communication module capable of local area wireless communications, can make an access to the Internet and by using authorization information and finance information of said UIM card read out through wireless communications, carries out functions such as payment of purchased goods, recharging the balance of said UIM card, ticketing, and transaction particulars inquiry. In the memory of said UIM card 12 recorded are authorization information such as a mobile identification number, private identification number (hereinafter, referred to as PIN), and a certificate; and personal information such as a user name, address, and contact number; also stored are finance information of various IC cards (credit card, debit card, prepaid card, traffic card). The UIM card 12 is equipped with a microprocessor and memories so that storing and updating finance information are possible. In the FIG. 1, for the purpose of brevity, constituting elements such as a mobile communications base station and a telephone exchange system of a mobile telecommunication company which appear prior to the Internet access have been omitted.

The said payment terminal 30 is similar to CAT (Credit Authorization Terminal) installed at a membership store and is equipped with a local area wireless communication module to communicate with said mobile terminal 10. The said payment terminal 30 is connected to a card issuing company 40 or a financial institution 50 through the Internet or VAN (Value Added Network) which is not shown in the drawing.

The said card issuing company 40 and financial institution 50 carryout the functions such as approval of payment for purchased goods and recharging the balance of a UIM card 12 using finance and authorization information stored in the UIM card 12.

The said shopping mall 60 is a merchandise sales system providing online purchase and payment and carries out different processes according to the information about payment means received from the user, i.e., finance information of a UIM card 12: authorization is received by a card issuer 40 in case of a credit card; approval of a transaction is confirmed by the corresponding financial institution 50 in case of a debit card; and in case of a prepaid card, the balance remained in the UIM card 12 is checked and if appropriate, the payment process is completed and purchased goods are shipped by using personal information read out and received from said UIM card 12.

The said service providing system 70 communicates with said mobile terminal 10 connected to the Internet 20 and provides various services in association with a card issuer 40, a financial institution 50, and a shopping mall 60 by making use of authorization information, personal information, and finance information of an inserted UIM card 12. The said service providing system 70 comprises a payment processing system 72 handling payment for purchased goods or services, a prepaid card recharging system 74 recharging the balance of a prepaid card of the UIM card 12, a ticket issuing system 76 allowing ticket reservation using finance information of the UIM card 12 and transmitting information about reserved tickets to said mobile terminal 10, and a traffic card issuing system 78 providing services intended for a traffic card for expressway, subway, or bus.

Figure 2:
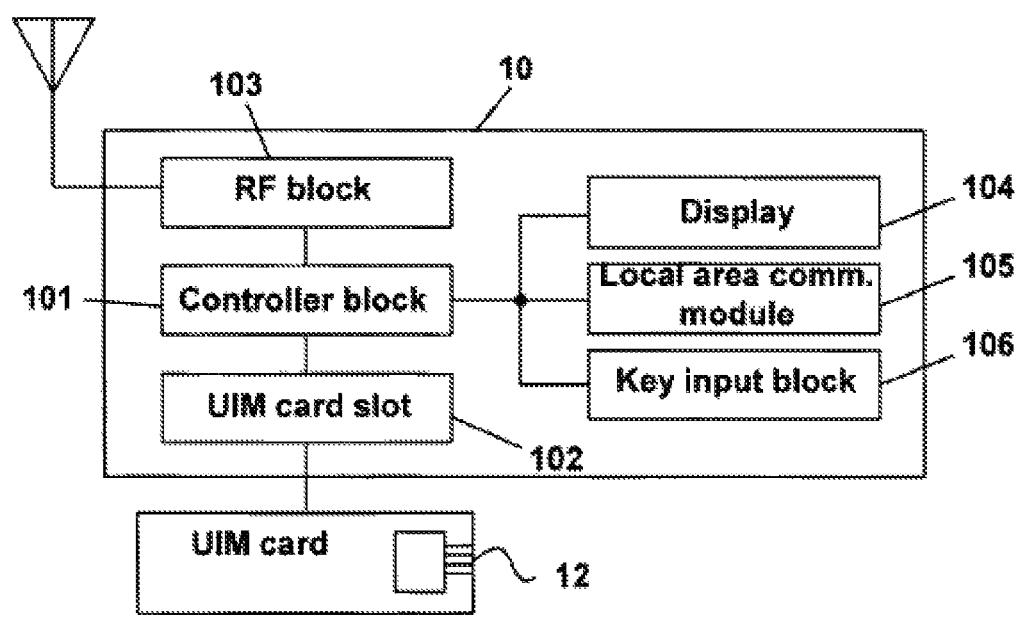
FIG. 2 is a diagram illustrating a simplified structure of a mobile terminal according to the present invention.
Figure 3:
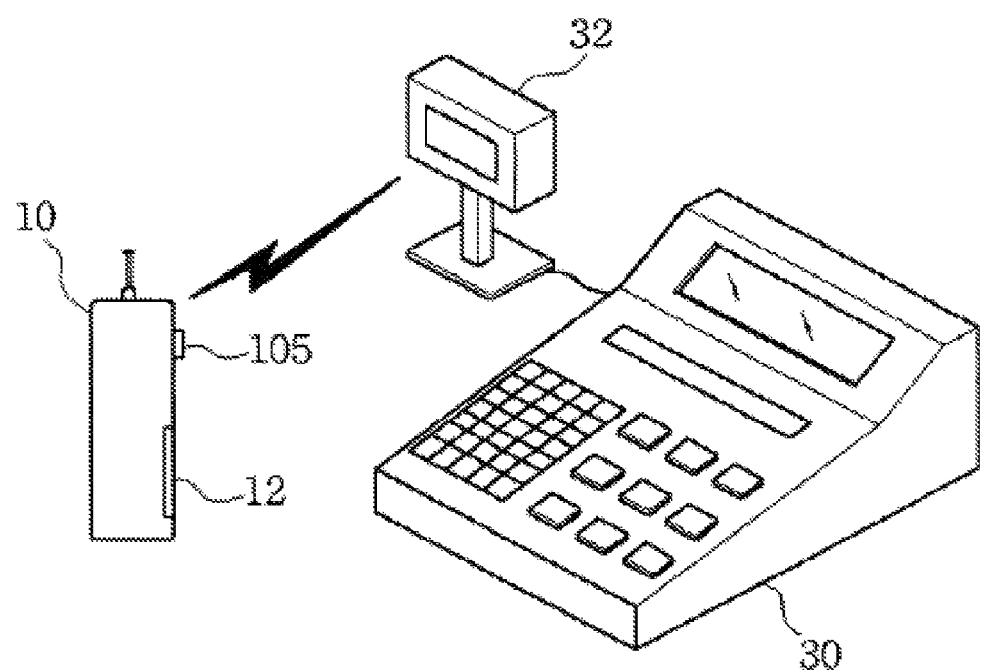
FIGS. 3 and 4 are diagrams illustrating an embodiment of a payment system using a local area communication module according to the present invention.
Figure 4:
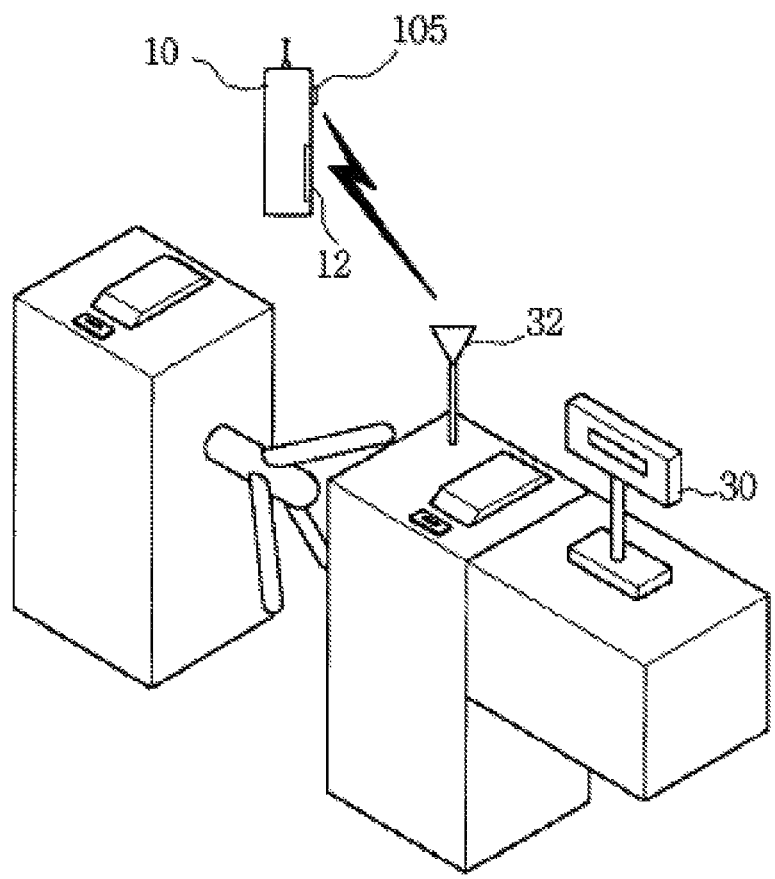

FIG. 2 is a diagram illustrating a simplified structure of a mobile terminal according to the present invention. FIGS. 3 and 4 are diagrams illustrating an embodiment of a payment system using a local area communication module according to the present invention.

A mobile terminal 10 according to the present invention, without modifying an ordinary mobile terminal, can detach, attach, and decrypt a UIM card 12 wherein authorization information, finance information, and personal information are stored. The mobile terminal 10 is equipped with a UIM card slot 102 through which data can be recorded into the UIM card and a local area communication module 105 capable of local area wireless communication with a payment terminal 30. The said local area communication module 105 can employ a communication system using RF, IrDA (Infrared Data Association), or Bluetooth. Payment, recharging, and ticket reservation through the Internet utilize existing communications part of the mobile terminal.

As shown in FIGS. 3 and 4, payment is accomplished by communicating with a local area communication module 32 installed in a payment terminal 30. FIG. 3 shows the payment terminal 30 installed at an ordinary store and FIG. 4 shows the payment terminal installed at an entrance gate of a theater or a subway station.

Figure 5:
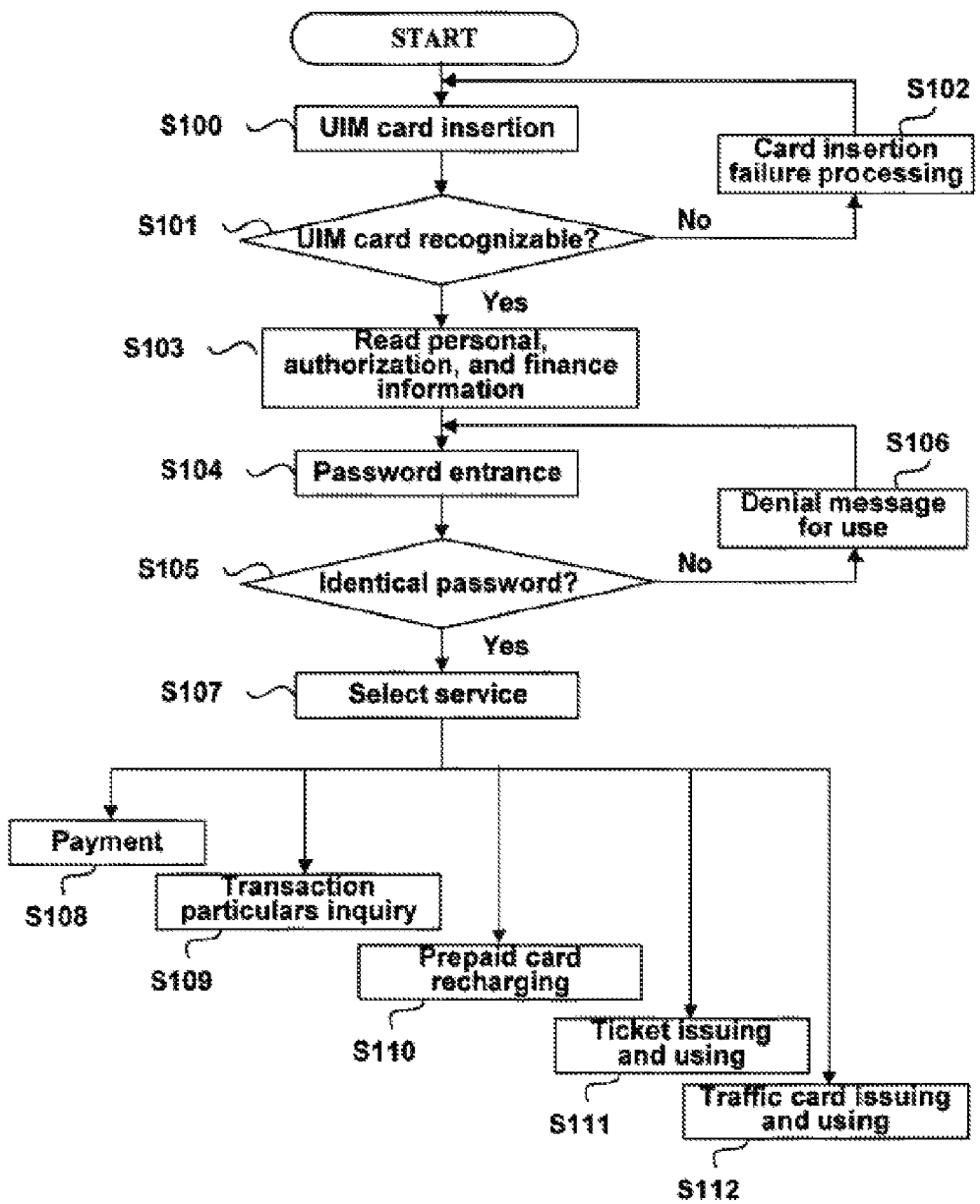
FIG. 5 is a flowchart illustrating a procedure to use various services provided by a mobile terminal according to the present invent ion.

FIG. 5 is a flowchart illustrating a procedure to use various services using a mobile terminal according to the present invention.

First, a UIM card 12 is inserted into the UIM card slot 102 of a mobile terminal S100. After insertion of the UIM card 12, the mobile terminal 10 decides whether or not the UIM card 12 is recognizable and insertion has been correctly made; when it turns out to be incorrect, the mobile terminal generates a fault message notifying the user of a card insertion failure S102; otherwise, finance information, authentication information, and personal information stored in the memory of the UIM card 12 are read out S103. Next, a password is requested to verify whether or not he or she is a valid user and after the entrance of a password S104, a decision is made whether or not it is identical to the password read out from authorization information S105. When the entered password is not correct, a denial message is displayed S106 and re-entry of a password is requested to the user. In case of a correct password, a service menu is displayed and the user's selection for a service is awaited. The user selects a desired service from displayed menus such as payment S108, transaction particulars inquiry S109, prepaid card recharging S110, ticket issuing and using S111, and traffic card issuing and using S112.

Hereinafter, each service will be described in more detail.

Figure 6:
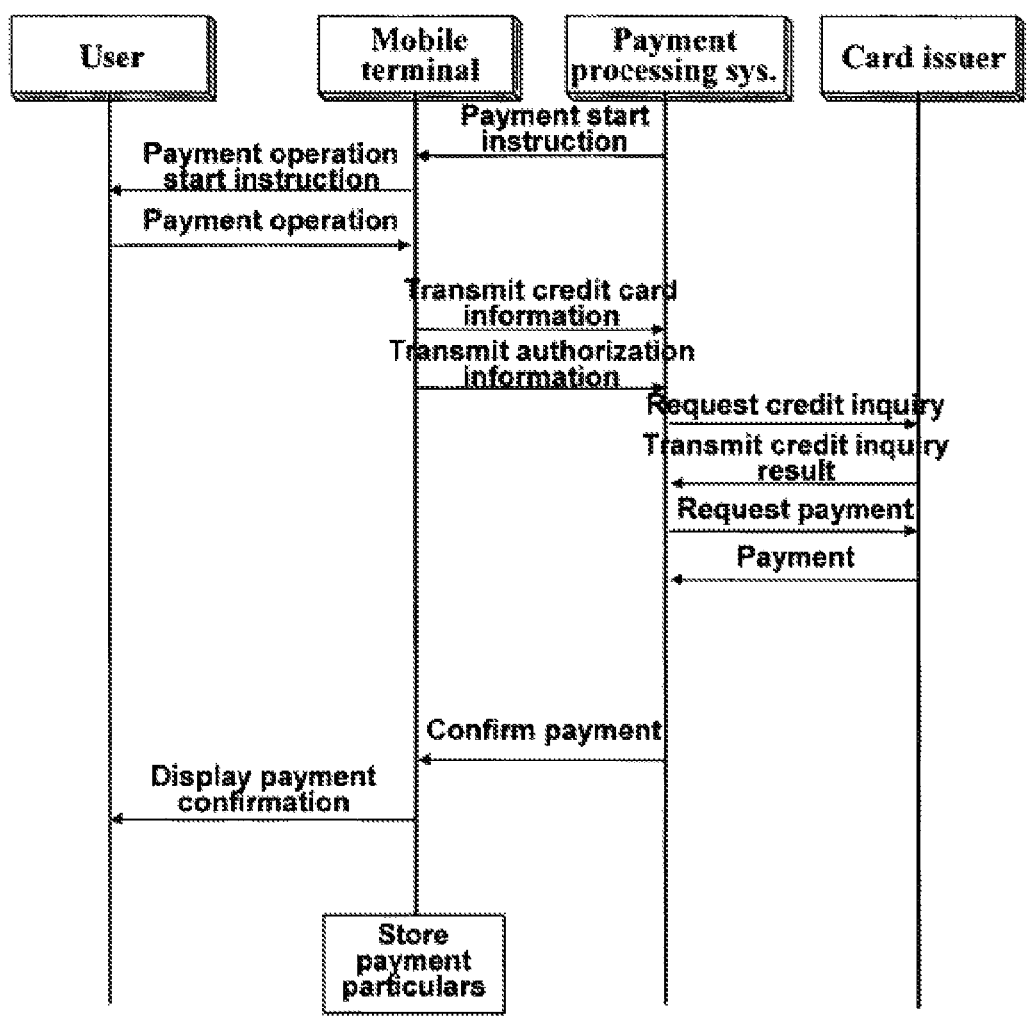
FIG. 6 is a flowchart illustrating a payment process using a credit card according to a first embodiment of the present invention.
Figure 7:
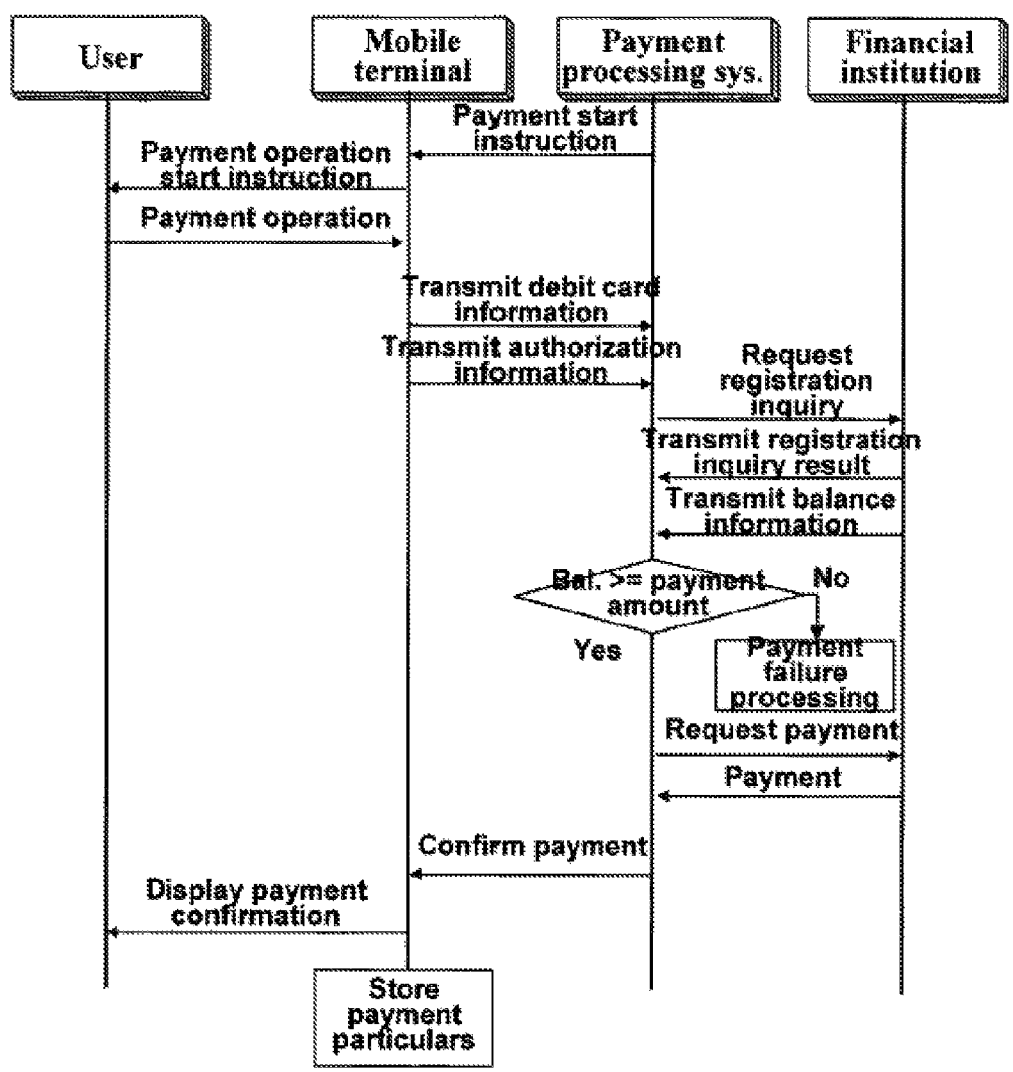
FIG. 7 is a flowchart illustrating a payment process using a debit card according to a second embodiment of the present invention.
Figure 8:
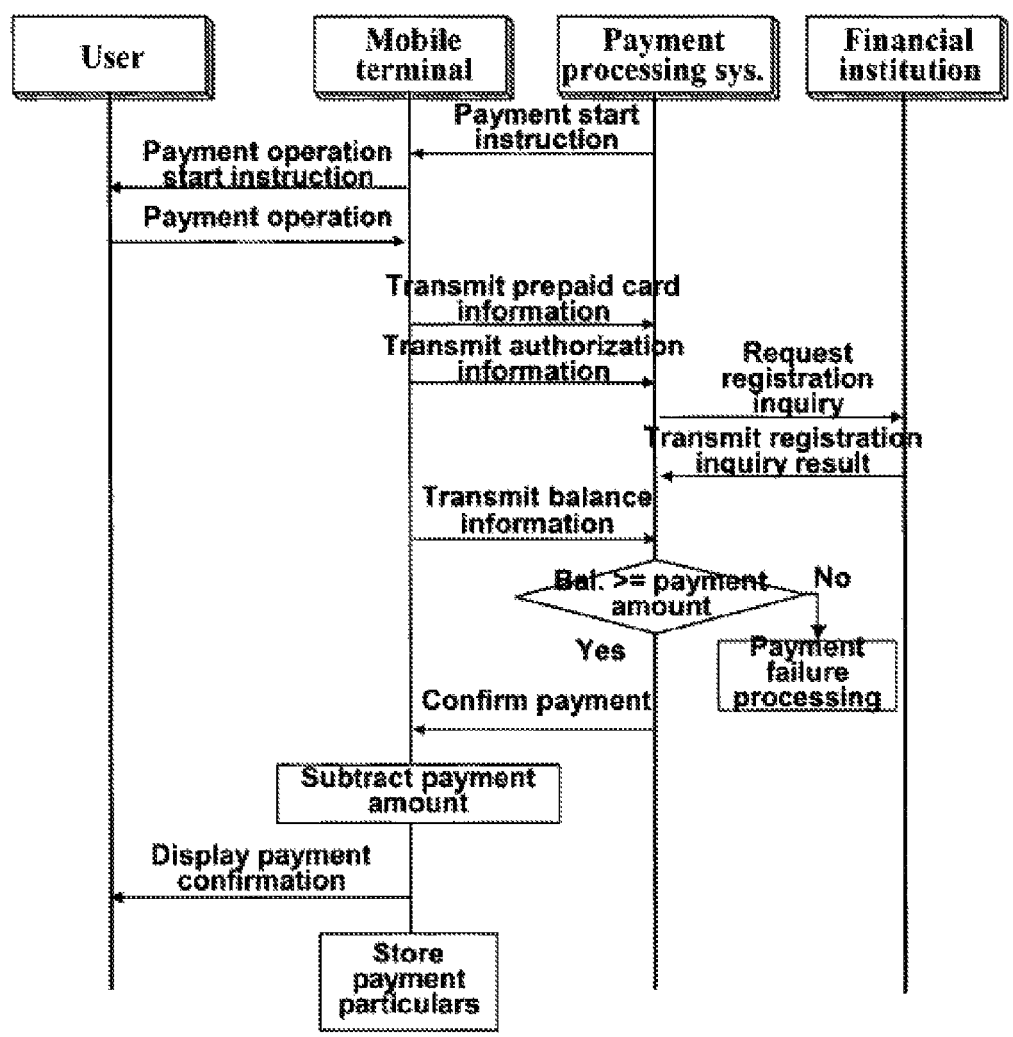
FIG. 8 is a flowchart illustrating a payment process using a prepaid card according to a third embodiment of the present invention.

FIGS. 6 to 8 are service flowcharts when a user selects the payment service from said service menus. It is assumed that steps prior to payment such as choosing particular goods to purchase and selecting a payment means have been completed.

FIG. 6 is a flowchart illustrating a payment procedure using a credit card according to a first embodiment of the present invention.

When the payment processing system 72 of a service providing system sends a payment start instruction, the user enters purchasing information such as a shopping mall, purchasing list and purchased amount and carries out requisite operations for payment. At this time, purchasing information may be handled so that it can be automatically filled in at the shopping mall. After operations for payment have been accomplished by the user, credit card information and authorization information read out from the UIM card 12 through the S103 procedure described in FIG. 5 are transmitted to the payment processing system 72. The payment processing system 72 requests a credit inquiry to a card issuer 40. If approval for card use is received according to the result of the credit inquiry, the payment processing system 72 makes a payment request and completes the payment process. After payment is completed and a confirmation message for payment is transmitted to the mobile terminal 10, the mobile terminal 10 displays the confirmation message for payment to the user and stores the payment particulars into the memory of the UIM card 12.

FIG. 7 is a flowchart illustrating a payment procedure using a debit card according to a second embodiment of the present invention. FIG. 8 is a flowchart illustrating a payment procedure using a prepaid card according to a third embodiment of the present invention.

As shown in FIG. 6, the user who received the payment start instruction from the payment processing system 72 enters purchasing information and carries out requisite operations for payment. Then, the mobile terminal 10 transmits debit card information and authorization information read out from the UIM card 12 to the payment processing system 72. The payment processing system 72 makes a registration inquiry and requests balance information to the corresponding financial institution 50; the payment processing system 72 compares the balance of the user's account of the corresponding financial institution 50 with the payment amount. If the account has an insufficient balance, the payment processing system 72 carries out a payment failure processing, whereas, if the balance is more than the payment amount, the payment processing system 72 requests a payment to the financial institution. After completion of the payment, the payment processing system 72 transmits a confirmation message for payment to the mobile terminal 10 so as to display the message to the user. The mobile terminal 10 stores payment particulars into the memory of the UIM card 12 after completion of the payment.

The payment procedure using a prepaid card is similar to said FIG. 7. It is different from that of FIG. 7 in that balance information is not received from the financial institution 50, but balance information of a prepaid card in the UIM card is received directly from the mobile terminal 10; after completion of payment, the balance of the prepaid card in the UIM card 12 subtracted by as much as the payment amount is stored by the mobile terminal 10.

Prior to the aforementioned payment service, if a shopping mall employed a method to obviate the user's manual entrance of personal information such as merchandise delivery address by automating the transmission of personal information in the UIM card 12, payment processing would be more simplified.

Figure 9:
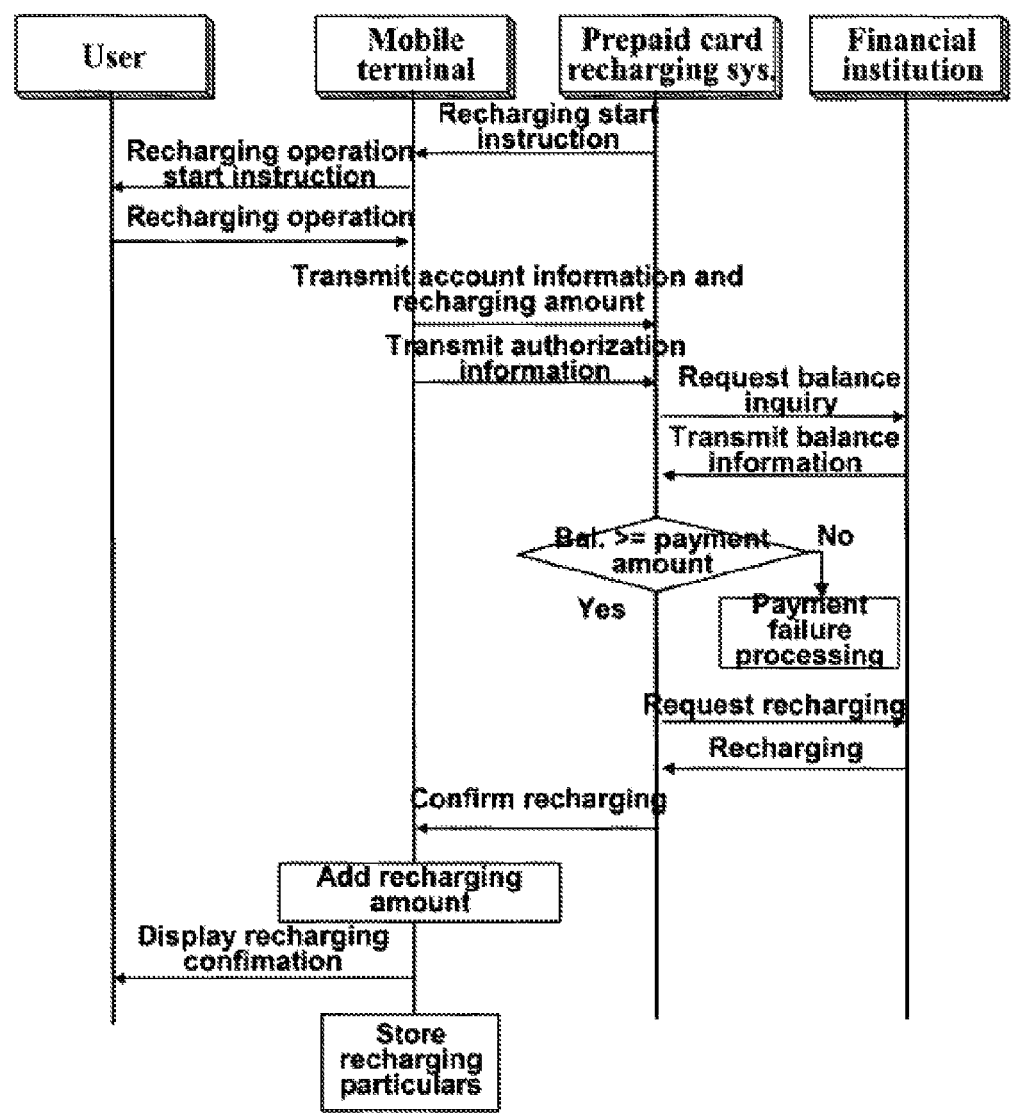
FIG. 9 is a flowchart illustrating a procedure for recharging a prepaid card according to a fourth embodiment of the present invention.

FIG. 9 is a flowchart illustrating a recharging procedure for a prepaid card according to a fourth embodiment of the present invention.

A prepaid card recharging system 74 which received a request for recharging a prepaid card from the user issues a recharging start instruction to the mobile terminal 10. The user transmits recharging request information such as a desired recharging amount, a correspondent financial institution, account information, and authorization information to the prepaid card recharging system 74. In this case, too, it would be desirable that information except for the recharging amount is read out from the UIM card 12 and transmitted. By using transmitted information, the prepaid card recharging system 74 makes an access to the corresponding financial institution 50 and requests a balance inquiry; the financial institution 50 transmits balance information of the corresponding account. The prepaid card recharging system 74 compares the desired recharging amount which the user has entered with the balance of the corresponding account; if the balance turns out to be insufficient, the prepaid card recharging system 74 carries out a recharging failure processing, whereas, if the balance is more than the recharging amount, the prepaid card recharging system 74 requests recharging to the financial institution 50 functioning the same as an account transfer request. In case of acceptance of the recharging request, the prepaid card recharging system 74 transmits a confirmation message for recharging to the mobile terminal 10. The mobile terminal 10 which received the confirmation message for recharging updates balance information of the prepaid card in the UIM card 12 by adding the recharging amount; then, the mobile terminal 10 displays the confirmation message for recharging to the user and stores recharging particulars into the memory of the UIM card 12.

This procedure is identical to that of recharging a traffic card using a traffic card issuing system 78.

Figure 10:
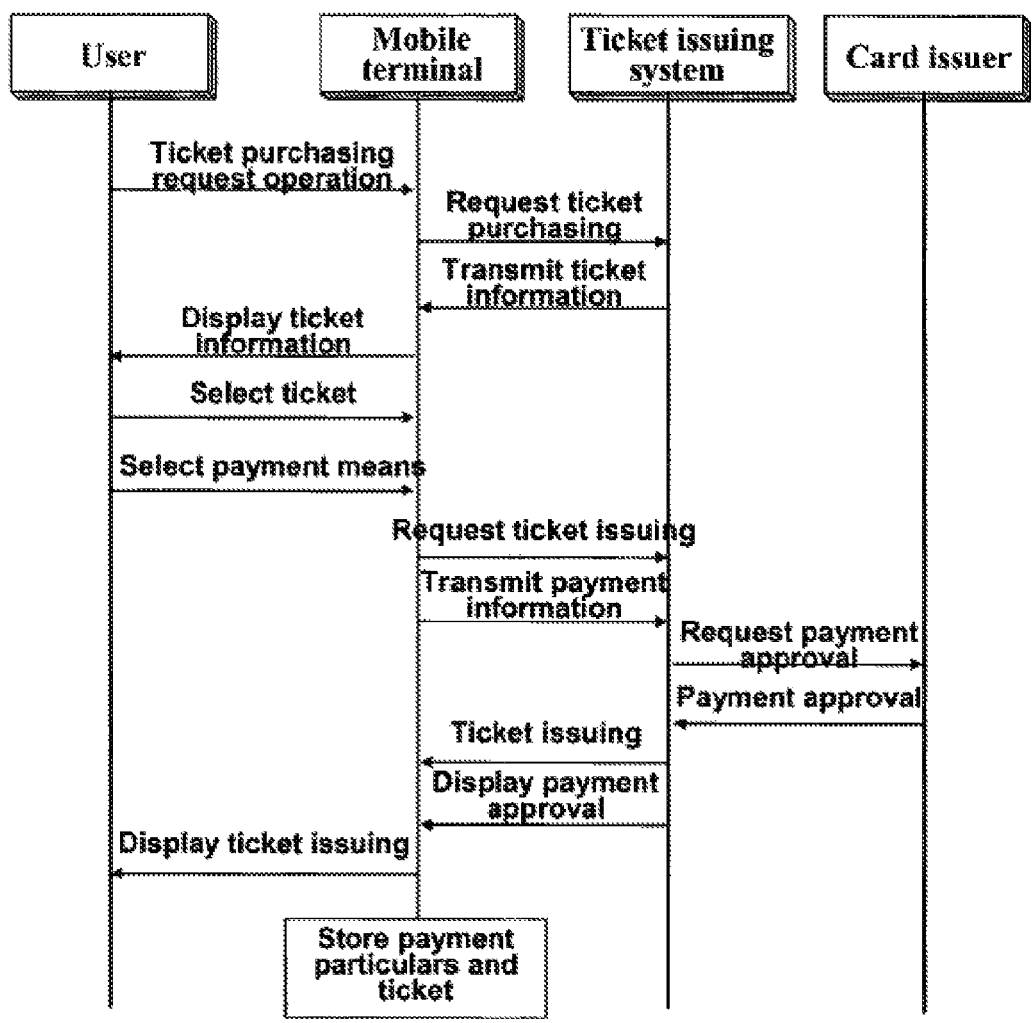
FIG. 10 is a flowchart illustrating a procedure for issuing a ticket according to a fifth embodiment of the present invention.
Figure 11:
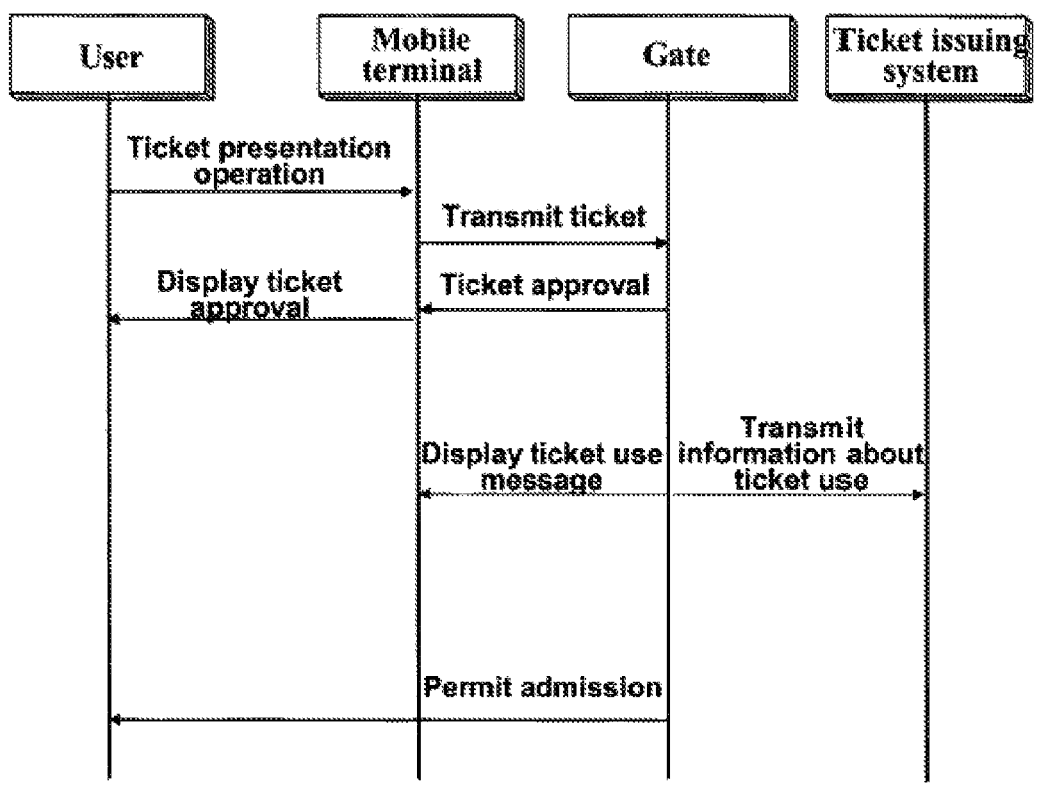
FIG. 11 is a flowchart illustrating a procedure to use a ticket according to a sixth embodiment of the present invention.

FIG. 10 is a flowchart illustrating a procedure for issuing tickets according to a fifth embodiment of the present invention and FIG. 11 is a flowchart illustrating a procedure for using tickets according to a sixth embodiment of the present invention.

The said ticket issuing denotes reservations for various cultural performances or movie tickets.

When the user selects the ticket issuing and using menu shown in FIG. 5 and requests ticket purchasing, the mobile terminal 10 transmits a signal of ticket purchasing request to a ticket issuing system 76. The ticket issuing system 76 which received the request provides the mobile terminal 10 with information about tickets available for purchasing (contents of the performance, available seats, or price). The user selects a ticket to purchase from among displayed ticket information and further selects a payment means from among credit card, debit card, and prepaid card. After completion of selecting a ticket and a payment means by the user, the mobile terminal transmits the corresponding information (information about the selected ticket and the payment means) to the ticket issuing system 76. The ticket issuing system 76 completes the payment process through said procedure of FIG. 6, FIG. 7, or FIG. 8 according to the transmitted information and issues the purchased ticket to the mobile terminal 10. The mobile terminal displays information about the issued ticket and stores transaction particulars and ticket information into the memory of the UIM card 12.

A procedure for using the tickets issued from such procedure is described below.

If the user carries out ticket presentation operations with the mobile terminal 10 before passing through a gate, the mobile terminal 10 transmits ticket information stored in the memory of the UIM card 12 to the payment terminal 30 installed at the gate. The payment terminal of the gate authenticates transmitted ticket information with a subsequent approval of the ticket and transmits an approval message to the mobile terminal 10, thereby displaying the approval message to the user. After completion of the transmission of the approval message, the payment terminal 30 of the gate transmits information indicating ticket use to the ticket issuing system 76 and displays a ticket use message on the mobile terminal 10. When all the procedure has been done, a gate bar, for example, is opened and the user is allowed to proceed.

FIGS. 12 and 13 are diagrams illustrating examples of display window for transaction particulars inquiries according to the present invention.

When transactions such as said payment, recharging a prepaid card or a traffic card, and ticket reservation are settled, consequent particulars are all stored in the memory of the UIM card 12 as described previously. The stored information can be displayed assorted according to particular service categories as shown in FIG. 12 or FIG. 13. Or, it can be displayed assorted according to a particular search condition such as date, amount, and transaction particulars.

The amount of money paid during said payment, ticketing, or recharging a traffic card or a prepaid card may be demanded added to the communications expenses (for example, a telephone bill) of the mobile terminal 10 instead of settlement by a financial institution.

In addition, since information such as a mobile identification number (MIN) and PIN is stored in said UIM card 12, even if it is inserted into another mobile terminal 10, the user can use the aforementioned services with his or her own mobile terminal 10 without complicated procedures. Therefore, roaming services both for communications and finance information can be provided.

Figure 14:
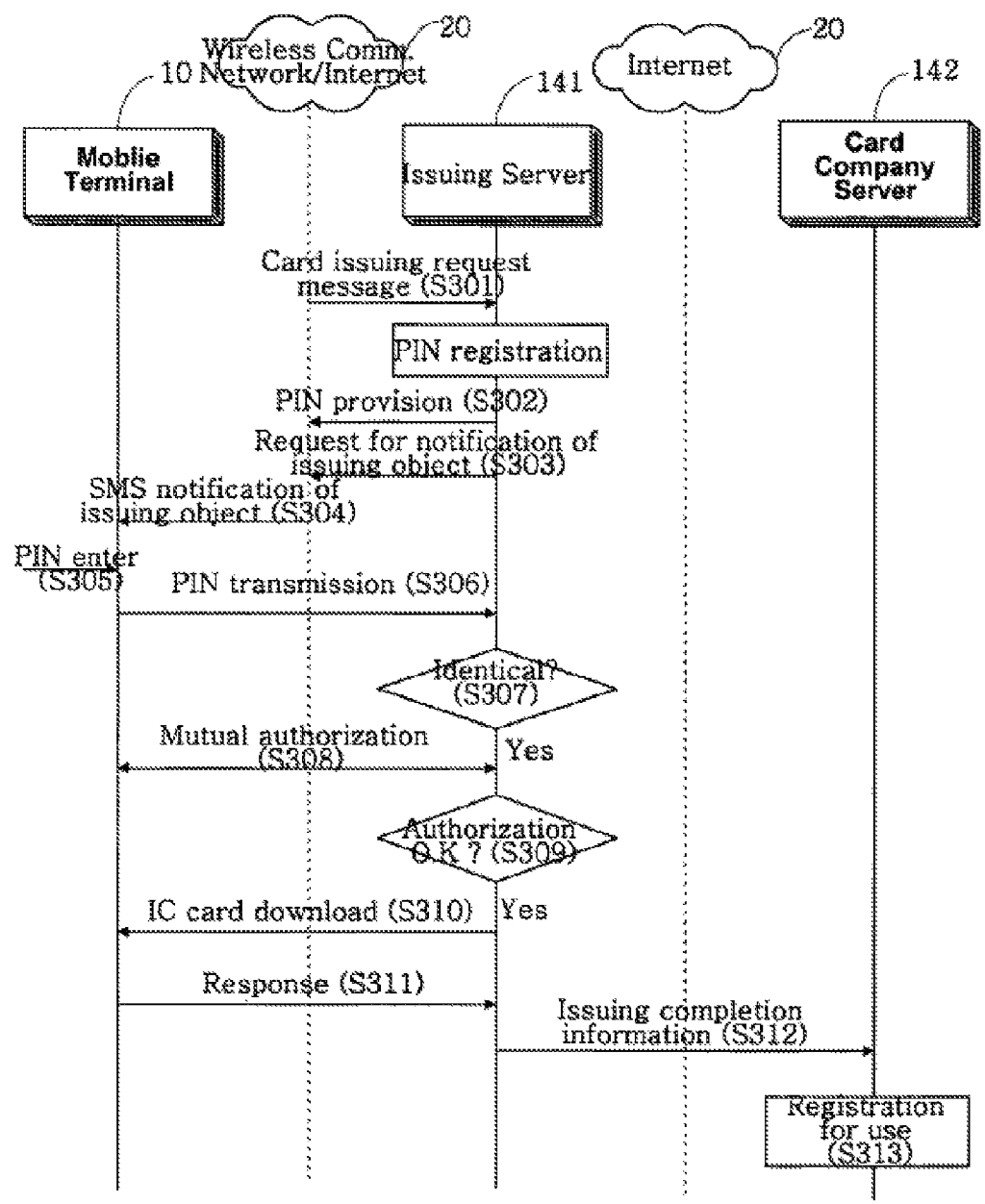
FIG. 14 is a flowchart illustrating a procedure for issuing an IC card according to a seventh embodiment of the present invention.

FIG. 14 is a flowchart illustrating a procedure for issuing an IC card according to a seventh embodiment of the present invention. It is intended that through a wireless communications network or Internet, an IC card such as various identification cards, a license, or a credit card is issued and used online or offline. The present embodiment describes a procedure for issuing a credit card as a specific example of the IC card issuing procedure. In FIG. 14, the reference number 141 is installed in said service providing system 70 of FIG. 1 and the reference number 142 is installed in said card issuing company 40 of FIG. 1.

First, if a message of card issuing request from an applicant is received at said IC card issuing server 141 through the wireless Internet based on WAP or wired Internet based on Web S301, the said issuing server 141 registers the PIN (Personal Identification Number) of the particular applicant based on said received message of card issuing request; thereafter, the said issuing server 141 provides said applicant with the PIN through WAP or Web and closes the connection with the applicant.

Subsequently, said issuing server 141 sends a request to a SMSS (Short Message Service Server) (not shown) of said wireless communications network 20 to notify the corresponding mobile terminal 10 designated by said received message of card issuing request that the applicant is the object of the IC card issuing S303. The said SMSS notifies said mobile terminal 10 of said requested notification about the issuing object through SMSC (Short Message Center) (not shown) in the form of a short message S304.

The said mobile terminal 10 recognizes that it is the issuing object based on said received SMS message. If said PIN information is entered by the user of said mobile terminal 10, the mobile terminal 10 transmits the entered PIN information to said issuing server 141 S306.

The said issuing server decides whether or not the received PIN information from said mobile terminal 10 is identical to said registered PIN information and if the result turned out to be non-identical, closes the transaction S307.

Next, if the PIN information is found to be identical at said S307 stage, a mutual authorization process is carried out according to the agreement predetermined by cryptogram so as to authenticate the mutual validity of the IC chip embedded in said mobile terminal 10 (namely, the UIM card 12) and said issuing server 141.

After the mutual authorization between said IC chip 12 and said issuing server 141 has been completed in said S308 stage, the said issuing server 141 selects an application program to enable the use of said requested IC card and downloads it to said mobile terminal 10 S310. The said mobile terminal 10 stores the said downloaded application program into the memory of said IC chip 12 and responds by notifying the said issuing server 141 of the completion of the storing process S311.

Finally, upon receiving the response from said S311 stage, by providing the server of the corresponding card company 412 with the information indicating the completion of said IC card issuing S312, thereby accomplishing the registration for the use of said issued IC card in real-time, the said issuing server 141 allows the said IC card to be used between said mobile terminal 10 and said payment terminal 30 belonging to said server of the card company 142 by wireless communication such as IrFM communication system S313.

In case of a transaction using the aforementioned IC card in said S313 stage, the server of said card company 142 communicates with said payment terminal 30 as the corresponding distribution terminal in association with the server 142 based on the information about said registered IC card for use. The said mobile terminal 10 communicates wirelessly in the form of an IrFM message with said payment terminal 30 based on said application program, thereby enabling said IC card to be used according to its purpose.

Figure 15:
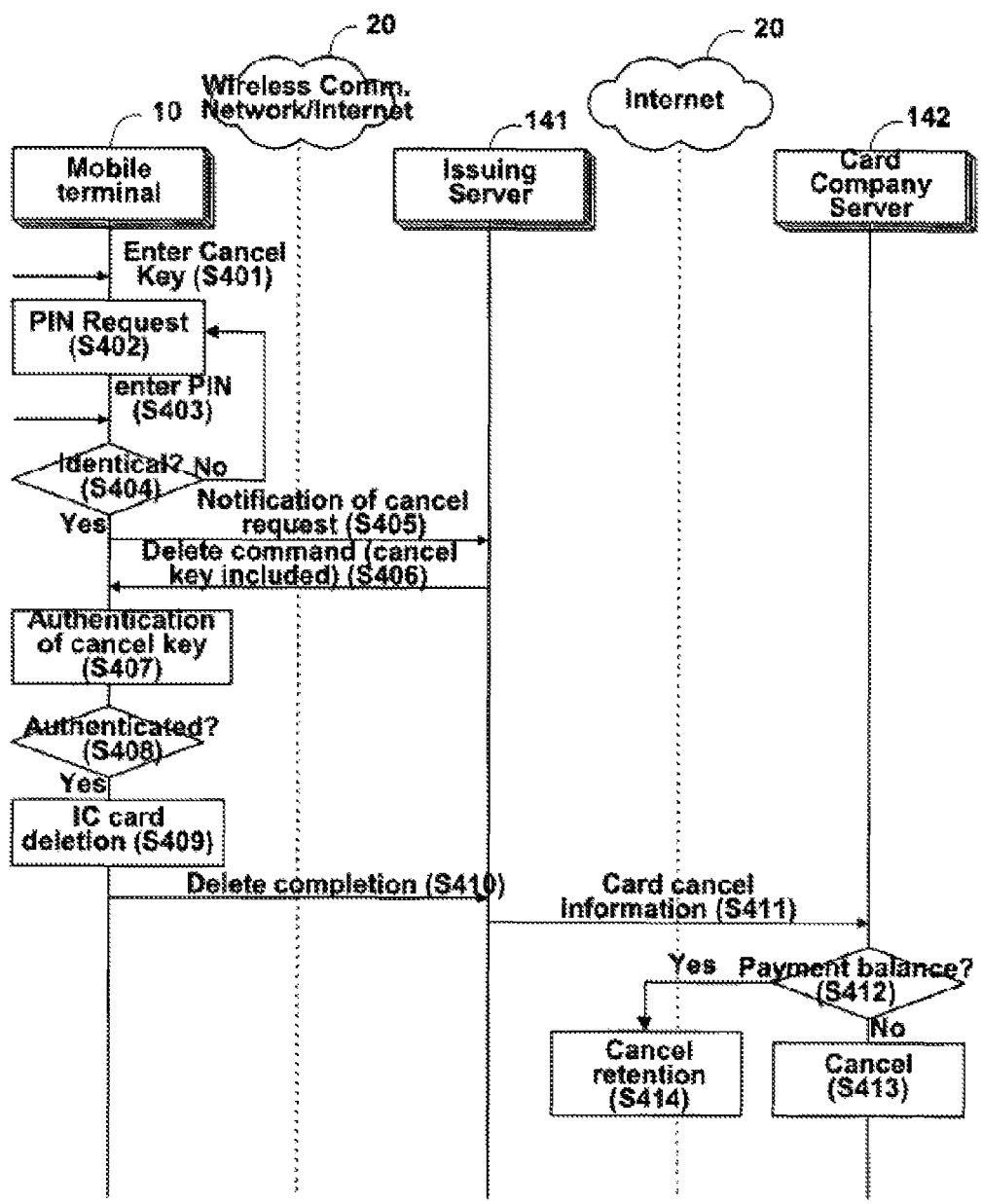
FIG. 15 is a flowchart illustrating a procedure for canceling an IC card according to an eighth embodiment of the present invention.

FIG. 15 is a flowchart illustrating a procedure for canceling an IC card according to an eighth embodiment of the present invention, more specifically, the procedure of canceling the IC card issued through the procedure described in FIG. 14.

The said mobile terminal 10, when the predetermined canceling key is entered S401, generates a request for the entrance of the PIN so as to identify the user by displaying a message such as "Enter the PIN input" on a window S402. After the PIN has been entered S403, the said mobile terminal 10 decides whether or not the entered PIN information is identical to the preset PIN information S404 and if the result turned out to be non-identical, requests a re-entrance, whereas, when they are found to be identical, the said mobile terminal 10 transmits a notification message of cancellation request to said issuing server 141 S405.

The said issuing server 141 transmits a message of a delete command of the corresponding application program to cancel the IC card to said mobile terminal 10 with the encrypted cancel key of the issuer S406.

The said mobile terminal 10 carries out authentication of said received cancel key transmitted according to the predetermined cryptogram S407 and makes a decision on the authentication result S408. When the authentication is completed normally, the said mobile terminal 10 deletes the application program as said IC card downloaded and in use from said S409 stage of FIG. 14 S409 and transmits a response message notifying the said issuing server 141 of the completion of the deletion S409.

The said issuing server 141 delivers information about the cancellation of the card based on said received response message of the delete completion to the server of the card company 142 as an issuer S410. The said server of the card company 142 decides whether or not payment balance exists in the IC card to be cancelled S411. If it turns out that no payment balance remains, the cancellation process is completed S413, whereas, if the payment balance exists, the cancellation is retained S414.

Figure 16:
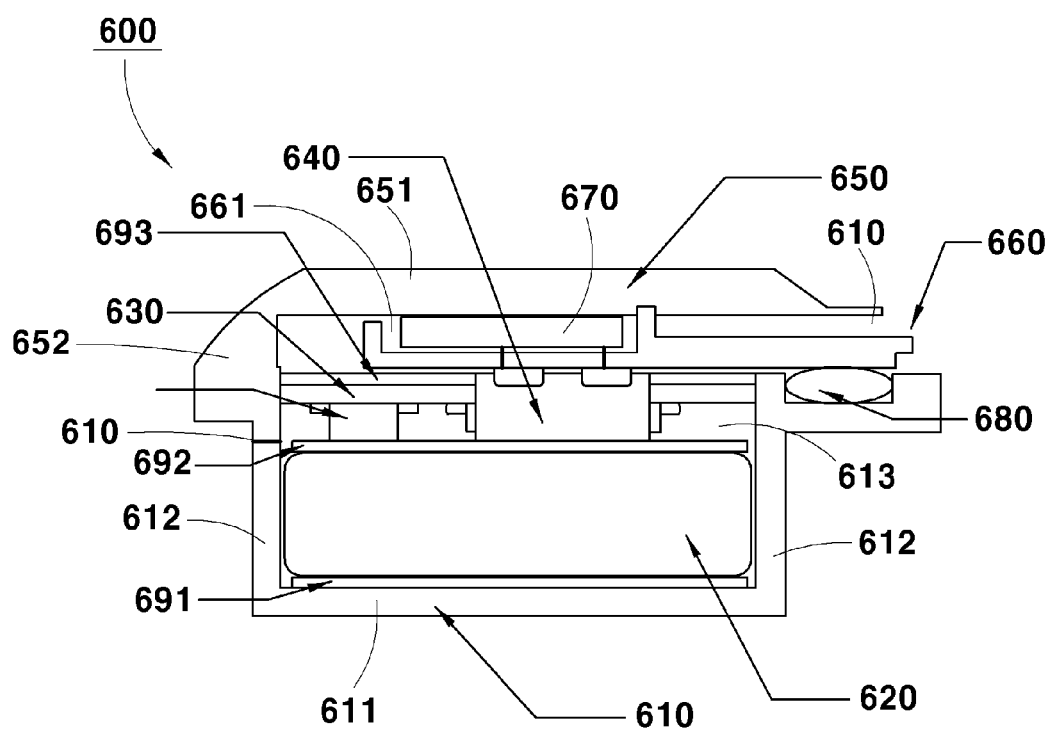
FIG. 16 is a sectional view of a battery pack for a mobile terminal wherein an IC chip can be mounted according to an embodiment of the present invention.

FIG. 16 is a sectional view of a battery pack for a mobile terminal wherein an IC chip can be installed according to an embodiment of the present invention. An IC (Integrated Circuit) chip (namely, the UIM card shown in FIG. 1) having various functions can be attached to and detached from the battery pack of the mobile terminal so that when the mobile terminal equipped with the battery pack having an embedded IC chip is used, various functions offered by the corresponding IC chip can be utilized.

As shown in the same figure, the battery pack 600 according to the present invention comprises a bottom casing 610, a battery cell 620, a printed circuit board 630, a connector 640, a top casing 650, a palette 660, an IC chip 670, a foreign material protector 680, and insulators 691-693 insulating necessary parts between constituting elements.

The said bottom casing 610 is composed of a planar bottom face 611 and side faces 612 forming the side part extended from the boundary of the bottom face 611, thereby the said bottom face 611 and said side faces 612 forming a container 613 as an inside space.

The said battery cell 620 is composed of ordinary Li-ion (Lithium ion) cells and installed in the bottom part of said container 613 with its exterior faces insulated by insulators 691-692.

The said printed circuit board 630 sits on the top face of said battery cell 620 and installed parallel to the top face of said battery cell 620 at the entrance side inside said container 613 with its boundary firmly fixed to said side faces 612.

The said connector 640 electrically connects said printed circuit board 630 and said IC chip installed in said palette 660. The said connector 640 is installed so that electrical signals of said IC chip 670 through said printed circuit board 630 are connected to the outside.

The said top casing 650 is composed of a planar top face 651 and a side part 652 forming side faces extended downwardly from the boundary of the top face 651. The said side part is so formed that three faces out of the four side faces thereof match the three faces of said side part 612 of said bottom casing and abutting faces are assembled such that they are firmly bonded each other by a bonding part 694. The remaining face out of the four faces of said side part 652 is open and the opened face forms an opening 653 with the dimension measured up to the downward length of said side part 652.

The said palette 660 has a holder 661 on the top face thereof wherein said IC chip 670 can be installed and can enter and exit through said opening 653 formed on one face of said top casing 650. In case said palette 660 is inserted and installed through said opening 653 after said IC chip 670 is installed, the palette 660 is connected to said connector 640, while it is located at the top face of said printed circuit board 630, thereby making said IC chip 670 and said printed circuit board 630 electrically connected through said connector 640.

The said foreign material protector 680 is so formed that a small groove is carved at the upper end of one of side faces of said bottom casing, thereby forming the entrance of said opening 653. The said insulators 691-693 are formed at the top face and bottom face of said battery cell 620 and positioned between said printed circuit board 630 and said palette 660, thereby insulating them.

Figure 17:
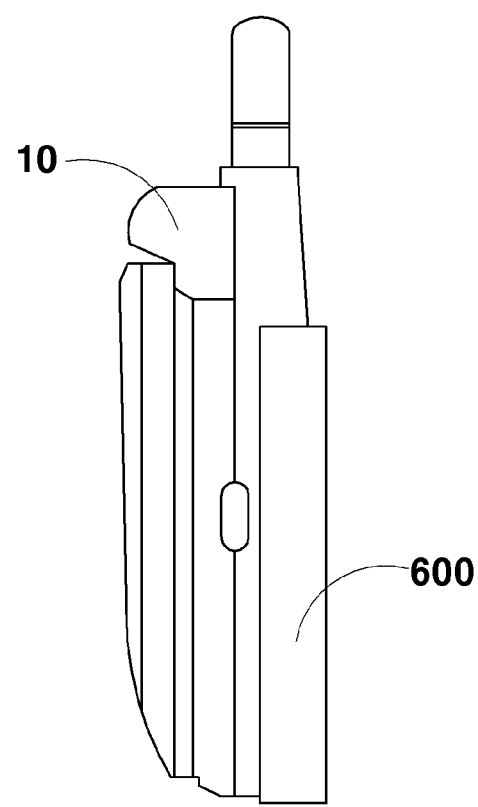
FIG. 17 is a diagram illustrating a usage of a battery pack with the structure thereof shown in FIG. 16, where the battery pack is installed in a battery housing compartment of a mobile terminal according to the present invention.

FIG. 17 is a diagram illustrating the use of said battery pack 600 assembled according to the diagram of FIG. 16, where said battery pack 600 is installed in the battery housing compartment of a mobile terminal 10.

In the following, the functions of a mobile terminal 10 according to the present invention equipped with said battery pack assembled as shown in FIG. 16 will be described.

First, after said palette 660 is extracted through said opening 653 and said IC chip 670 is installed in said holder 661 of the palette 660, if the palette 660 with the IC chip 670 installed is inserted in the reverse of said extraction direction through said opening 653, the said IC chip 670 and said printed circuit board 630 is electrically connected through said connector 640.

As shown in FIG. 17, if the battery pack 600 in said description is installed in the battery pack housing compartment of said mobile terminal 10, the said printed circuit board 630 and the internal circuit of said mobile terminal 10 are connected through said connector 640; thus, various functions can be realized according to the circuit design of said IC chip 670.

FIG. 18 is a diagram illustrating a battery pack for a mobile terminal with an embedded RF receiving antenna according to an embodiment of the present invention and describes a structure where an IC chip functioning as a traffic card is installed within the battery pack. More specifically, it describes a battery pack for a mobile terminal with an embedded RF receiving antenna, where the structure of a traditional battery pack has been modified so as to provide traffic and financial services by installing an RF receiving antenna for RF communication of said local area communication module 105 shown in FIG. 2 into the battery pack for the mobile terminal.

As shown in FIG. 18, the battery pack with an embedded RF receiving antenna comprises a battery pack 810 equipped with an IC chip (not shown in FIG. 18) and a printed circuit board 820 equipped with a function of an RF receiving antenna installed on one face of said battery pack 810.

The said printed circuit board 820 is composed of an IC chip connector 821 with multiple pins 1-8 used for signal connection with said IC chip; an impedance matching circuit block 822 connected to antenna pins 4, 8 of said connector 821 used for impedance matching between the antenna and feeder; a loop antenna 823 formed by the connection to said antenna pins 4, 8; and an ordinary circuit block 824 comprising a battery protection circuit block for the safety of said battery and a microcontroller (u-COM) circuit block controlling said IC chip. The said printed circuit board 820 is installed on one of faces of said battery pack 810 in order for said connector 821 of said printed circuit board 820 to be connected to said IC chip.

The said loop antenna 823 is made of wires 823*b* wound along a loop-shaped groove formed along the periphery of said printed circuit board 820. The loop-shaped groove is connected to the antenna pins 4, 8 of said antenna.

The said ordinary circuit block 824 basically comprises a battery protection circuit block responsible for the safety of the battery and a microcontroller circuit for the access and control of the IC chip.

The said connector 821 is a spare terminal to be used for the case when the connector pins 1, 2, 3, 5, 6, 7 electrically connecting said microcontroller circuit and said IC chip for the control thereof are not sufficient or another function in addition to the original function of IC chip connection is required. The said connector 821 is composed of the antenna pins 4, 8 electrically connecting said RF loop antenna 823 and said IC chip in the present embodiment.

The said impedance matching circuit block 822 is the most important part of the RF antenna technology. A proper impedance matching is crucial in order for radio waves to be emitted into the air through an antenna. For this purpose, the said impedance matching circuit block 822 is made of the combination of inductors and capacitors.

To illustrate the function of the battery pack integrated as shown in FIG. 18 according to an embodiment of the present invention, various functions implemented in the IC chip are carried out by communication between the IC chip embedded in said battery pack 810 (refer to the structure illustrated in FIG. 16) and the microcontroller in said ordinary circuit block 824 through said pins 1-3, 5-7 of said connector; when the IC chip functions as a traffic card, the said IC chip and said RF loop antenna 823 are connected through said antenna pins 4, 8 and the said impedance matching circuit block 822 conducts impedance matching between the two, thereby emitting radio waves optimized for RFID, whereby the IC chip communicates with a traffic terminal for payment of traffic charges (for example, a traffic terminal as a non-contact type fare terminal installed at the entrance and exit of a bus or a subway station). Accordingly, by installing the battery pack structured as shown in FIG. 18 into a mobile terminal, not only a necessary operating power can be provided but the function of an IC card (i.e., a UIM card) such as a traffic card or a credit card can be obtained as well.

FIG. 19 is a diagram illustrating a battery pack for a mobile terminal equipped with an RF receiving antenna according to another embodiment of the present invention and describes a structure where an IC chip functioning as a traffic card is installed in the main body of the mobile terminal. More specifically, it describes the battery pack for a mobile terminal with an embedded RF receiving antenna, where the structure of a traditional battery pack has been modified so as to provide traffic and financial services by installing an RF receiving antenna for RF communication of said local area communication module 105 shown in FIG. 2 into the battery pack for the mobile terminal.

As shown in FIG. 19, on one side of the battery pack 920 supplying power input to said mobile terminal installed are: a micro strip line 911 functioning as an RF antenna; an antenna connection terminal 912 connecting the micro strip line 911 and an IC chip (not shown) with the function of a traffic card embedded in the main body (not shown) of the mobile terminal; and a printed circuit board 910 wherein an impedance matching circuit block 913 is formed by the combination of inductors and capacitors for impedance matching between said micro strip line 911 and feeder (not shown) and which is connected to said antenna connection terminal 912.

To illustrate the function of the battery pack integrated in said manner, when the battery pack in FIG. 19 is installed into the main body of a mobile terminal, the said IC chip installed within the main body of said mobile terminal 10 as shown in FIG. 2 and said micro strip line are electrically connected through said connection terminal 912. The said impedance matching circuit block 913 carries out impedance matching between the two and emits radio waves optimized for RFID, whereby the IC card communicates with a traffic terminal for payment of traffic charges (for example, a traffic terminal as a non-contact type fare terminal installed at the entrance and exit of a bus or a subway station) and thus performs the function of a UIM card as a traffic card or a credit card.

The invention claimed is:

1. A mobile terminal comprising:
   (a) a battery pack, said battery pack being box-shaped and formed as a physically distinct subcomponent of the mobile terminal to which the battery pack may be attached and detached; said battery pack comprising:
      a face through which power is supplied to the mobile terminal when said batter pack is attached to the mobile terminal;
      a printed circuit board installed on said face of the battery pack;
      a micro strip line radio frequency antenna formed on the printed circuit board; and
      antenna connection terminals formed on the printed circuit board, and said antenna connection terminals electrically connected to the micro strip line,
   (b) a main body of the mobile terminal comprising an integrated circuit (IC) chip embedded in the mobile terminal,
   wherein the antenna connection terminals connect the micro strip line and said integrated circuit (IC) chip embedded in the mobile terminal when the battery pack is attached to the mobile terminal, and said micro strip line and IC chip detach when the battery pack is separated from the main body,
   wherein the IC chip provides financial information via the micro strip line radio frequency antenna to a payment terminal belonging to a server of a card company, and
   wherein the micro strip line radio frequency antenna is an RFID antenna.

2. The battery pack according to claim 1, further comprising:
   an impedance matching circuit block on said printed circuit board for impedance matching between said micro strip line and a feeder,
   wherein the impedance matching circuit block is connected to the antenna connection terminals.

3. The battery pack according to claim 1, wherein the payment terminal is a traffic terminal for payment of traffic charges.

4. The battery pack according to claim 2, wherein the impedance matching circuit block comprises a combination of inductors and capacitors.

5. The battery pack according to claim 1, wherein
   said face is a major face of the box-shaped battery pack,
   the box-shaped battery pack further comprises a plurality of side faces connected to a plurality of corresponding sides of the major face, and
   each of the plurality of side faces is smaller than the major face.

6. The battery pack according to claim 5, wherein the printed circuit board is smaller than the major face of the battery pack, and has a boundary completely within a boundary of the major face of the battery pack.

* * * * *